United States Patent Office 3,431,572
Patented Mar. 11, 1969

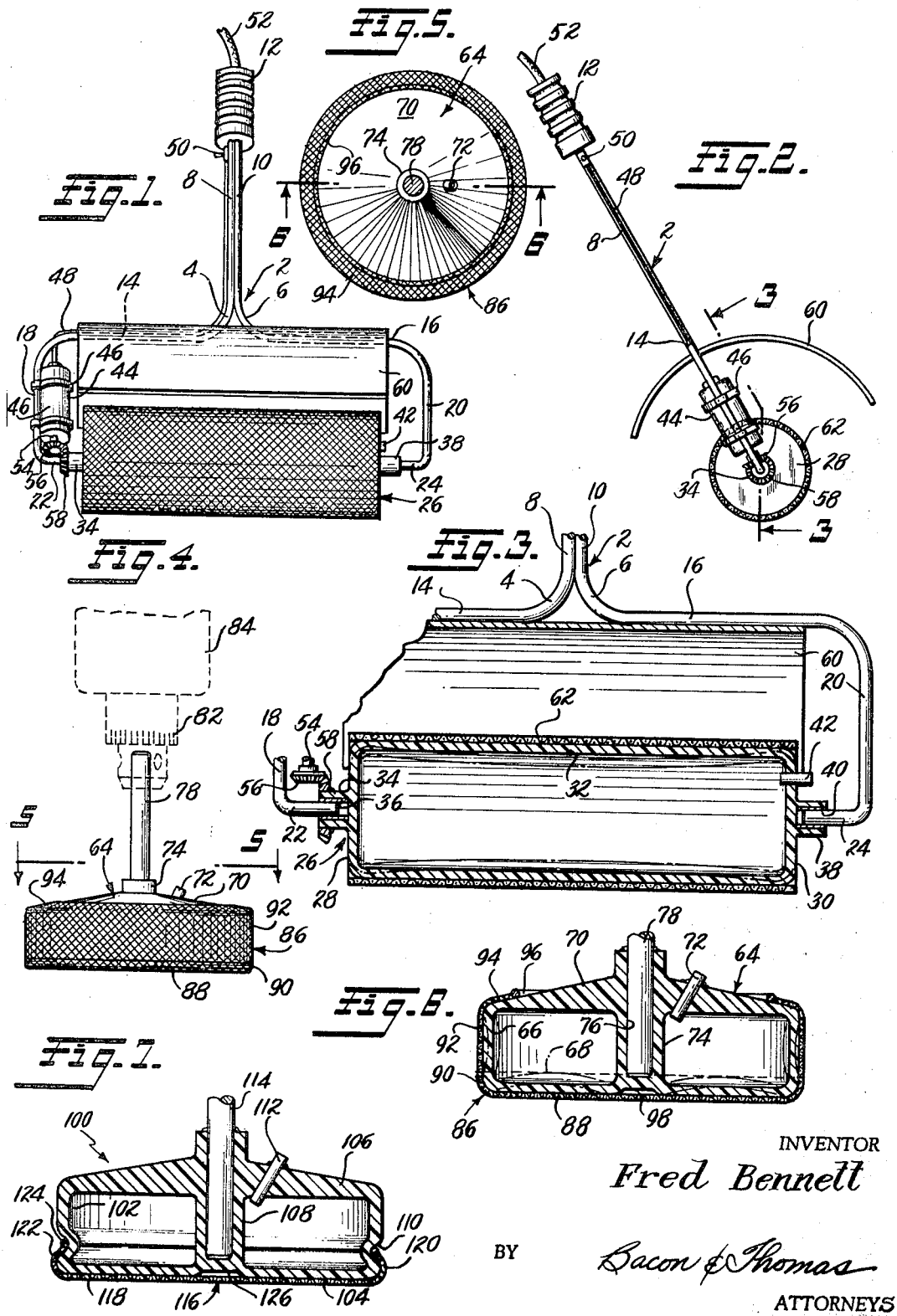

3,431,572
MECHANICAL SCOURING DEVICE
Fred Bennett, 1608 Philadelphia Road,
Joppa, Md. 21085
Filed Mar. 23, 1965, Ser. No. 442,007
U.S. Cl. 15—93     4 Claims
Int. Cl. B23d 79/04; A47d 11/00

ABSTRACT OF THE DISCLOSURE

A device for mechanically scouring, or scraping, cooking grills and other surfaces, comprising a circumferentially continuous scouring sleeve made of open mesh screen material mounted in tight engagement on an expandable core member. The core member is detachably mounted in a frame, the latter carrying a motor connected to the core to rotate the core and the scouring sleeve carried thereon. When the rotating scouring sleeve is engaged with a surface, at least one of the warp and weft of the sleeve is effective to scour by scraping the said surface.

---

This invention relates generally to scouring devices. More particularly, it relates to a scouring device adapted to be motor driven, and incorporating a replaceable scouring sleeve of open mesh screen material carried by an inflatable core.

The cleaning of grills and utensils utilized for preparing food often requires the use of a scouring device to remove matter clinging to the surface being cleaned. The present invention is directed to a power driven scouring device especially useful for cleaning the surfaces of such grills and utensils, and other like surfaces. Scouring action in the invention is provided by a sleeve of open mesh screen material carried by an inflated core which acts as backing for the sleeve, and which is adapted to be motor driven. The scouring sleeve has been found to be a most effective scourer, and is easily removed from the core when replacement becomes necessary due to wear, or when the sleeve must be cleaned because it has become too laden with foreign material removed in scouring.

It is the object of the present invention to provide a scouring device adapted to be power driven, and incorporating a readily removable scouring element.

Another object is to provide a scouring device incorporating a replaceable sleeve made of scouring material, and an inflatable core upon which said sleeve is mounted and which acts as a firm backing for the sleeve, the core being adapted to be motor driven.

A further object is to provide a scouring device including a frame and a motor driven inflatable core removably mounted on the frame, said core being designed to carry and give firm backing to a replaceable sleeve made of a scouring material.

Still another object is to provide a scouring sleeve made of open mesh screen material to provide effective scouring action, and designed to be removably mounted on and supported by an inflatable core.

Other objects and many of the attendant advantages of the present invention will be readily apparent from the following detailed description, when taken in connection with the accompanying drawings, wherein:

FIG. 1 is a front elevational view of a first embodiment of the invention;

FIG. 2 is a side elevational view of the scouring device of FIG. 1;

FIG. 3 is an enlarged, fragmentary, vertical sectional view taken generally along the line 3—3 in FIG. 2;

FIG. 4 is a side elevational view of a second embodiment of the invention, with the chuck and a portion of the housing of an electric motor for driving the scouring device shown in phantom lines;

FIG. 5 is a horizontal sectional view, taken on the line 5—5 in FIG. 4;

FIG. 6 is an enlarged, vertical sectional view, taken on the line 6—6 in FIG. 5; and FIG. 7 is a vertical sectional view, similar to FIG. 6, of a third embodiment of the invention.

Referring now to the drawing, the scouring device of the invention shown in the embodiment of FIGS. 1–3 includes a frame 2 made from a pair of cylindrical members 4 and 6, at least one of which is of resilient material. The members 4 and 6 include first portions 8 and 10, respectively, which are welded or otherwise secured together, and to the outer ends of which is attached a hand grip 12. Oppositely directed frame portions 14 and 16, respectively, extend horizontally from the handle portions 8 and 10, and parallel arms 18 and 20, respectively, extend perpendicularly from the opposite ends of said portions 14 and 16. The handle portions 8, 10, 14, 16, 18 and 20 all lie in a common plane, as is best shown in FIG. 2, and the lower ends of arms 18 and 20 terminate in confronting, aligned stub shafts 22 and 24, respectively, which also lie in said common plane.

Mounted between the stub shafts 22 and 24 is an inflatable cylindrical core 26, which preferably is molded from Teflon, or a like material. The core 26 includes a pair of radial end walls 28 and 30, formed integrally with a generally cylindrical side wall 32. Referring to FIG. 3, the side wall 32 is preferably molded so that when the core 26 is deflated, said side wall will assume the inwardly bowed configuration indicated by phantom lines. By so molding the core 26, upon inflation thereof, the side wall 32 will assume a substantially true cylindrical configuration.

If the side wall 32 were molded to a true cylindrical configuration, then upon inflation thereof, the central portion of said side wall would normally bulge outwardly. This bulging is undesirable in the invention, for the scouring device works best when the surface of the inflated core 26 is of substantially uniform diameter throughout its length. Such a uniform external configuration can be obtained by molding the core side wall 32 in the manner described.

Each of the end walls 28 and 30 has a hub means molded thereon, the hub means on the end wall 28 comprising an integrally molded cylindrical bearing 34 fitted with a sleeve bushing 36. The opposite end wall 30 has a cylindrical bearing 38 molded therewith, within which is received a sleeve bushing 40, both of the bearings 34 and 38 being positioned concentrically of the longitudinal axis of the core 26. The end wall 30 also is provided with an air valve 42, for use in inflating and deflating the core 26.

When the cylindrical core 26 is inflated, it is mounted on the stub shafts 22 and 24 by springing the arms 18 and 20 slightly apart to allow said stub shafts to enter the bushings 36 and 40. As has been described, at least one of the handle members 4 and 6 is made resilient, whereby the arms 18 and 20 can be sprung apart as described, and will resume their parallel relationship when released. It should be noted that the arms 18 and 20 have identical lengths subtantially greater than the diameter of the cylindrical core 26.

The frame arm 18 has an electric motor 44 secured thereto by suitable clamps 46, said motor being supplied with electricity by a conductor 48 which extends therefrom along the frame 2 to a toggle switch 50 mounted immediately below the hand grip 12. The switch 50 is connected to a conductor 52, which extends to a suitable power source for the motor 44. The motor 44 includes an output shaft 54, which has a bevel gear 56 on the outer end thereof.

The cylindrical bearing 34 formed integrally with the end wall 28 has a bevel gear mounted on the outer end thereof, said gear 58 being engageable with the drive gear 56 when the core 26 is mounted between the stub shafts 22 and 24. The cylindrical core 26 can thus be rotated about its longitudinal axis by operating the switch 50 to supply current to the motor 44.

Mounted on the horizontal frame portions 14 and 16 above the inflatable core 26 is an arcuate shield 60. As is best shown in FIG. 2, the frame 2 in normal use will be inclined rearwardly at an angle of about 45 degrees, and the arcuate shield 60 is mounted on said frame so that it extends for a substantial distance both in front of and behind the cylindrical core 26.

Received on the inflatable core 26 is a cylindrical scouring sleeve 62 made of open mesh screen material, and having an axial length corresponding to that of the side wall 32. The sleeve 62 can be made from steel, some other metal, or a suitable plastic, and if desired can be impregnated with a suitable scouring agent. The sleeve 62 has a uniform diameter throughout its length, said diameter being such that the sleeve will be in tight engagement with the side wall 32 when the core 26 is inflated. The warp and weft of the screen material from which the sleeve 62 is made both preferably extend at an angle of 45 degrees to the horizontal, as shown in FIG. 1. This arrangement insures that all portions of the sleeve will effect a scouring action when the cylindrical core is rotated. However, it may be desired in some instances to arrange the material of the scouring sleeve 62 so that one of the warp or the weft extends circumferentially about the sleeve, and so that the other thereof extends horizontally.

The scouring sleeve 62 is mounted on the inflatable core 26 by first removing said core from the frame 2. With the core 26 deflated, the scouring sleeve 62 is easily placed thereon. Air, or some other suitable gas, is then supplied through the valve 42 to inflate the cylindrical core 26 until the cylindrical side wall 32 thereof is in tight engagement with the scouring sleeve 62. The core 26 is then mounted between the stub shafts 22 and 24, with the bevel gear 58 engaged with the bevel gear 56. The scouring device is then ready for use.

The mechanical scourer of the invention is especially useful for cleaning grills and other cooking utensils of grease and other foreign matter. The motor driven cylindrical core 26 firmly supports the scouring sleeve 62, while at the same time rapidly moving said scouring sleeve over the surface to be cleaned. When the scouring sleeve 62 becomes worn or too heavily laden with removed foreign matter, it can be easily removed from the inflatable core 26, either for replacement or cleaning.

Another embodiment of the mechanical scourer of the invention is shown in FIGS. 4–6. An inflatable core 64 made of Teflon or the like is provided, and includes a cylindrical side wall portion 66 formed integrally with a generally radial end wall 68. As shown in FIG. 6, the radial end wall 68 and the cylindrical side wall 66 are both preferably molded so that when the core 64 is deflated they will bow inwardly, as indicated by phantom lines. Thus, when the core 64 is inflated, the cylindrical side wall portion 66 will be truly cylindrical, and the radial end wall 68 will be truly radial.

The upper end of the cylindrical side wall portion 66 is formed integrally with an end wall 70, the latter being provided with a suitable air valve 72 for use in inflating and deflating the core. A cylindrical hub 74 extends between and is molded integrally with the end walls 68 and 70, and projects above the end wall 70. The hub 70 is provided with a blind bore 76, within which is secured by bonding, or other suitable means, the lower end of a shaft 78. The upper end of the shaft 78 is adapted for mounting in a chuck 82 mounted on the output shaft of a suitable motor 84 (FIG. 4).

Mounted on the core 64 is a scouring sleeve 86, made of open mesh screen material like the scouring sleeve 62, and including a radial end wall 88 in the form of a circular disc, and terminating at its periphery in an upturned rim 90. Connected to the upper edge of the rim 90 is the lower edge of a cylindrical sleeve portion 92, the latter terminating at its upper edge in an inwardly directed annular portion 94, the inner periphery of which is secured to a circular element 96 of wire or the like. If desired, the cylindrical sleeve portion 92 can be made from a material different than that of the radial end wall or circular disc 88.

The scouring sleeve 86 is mounted on the deflated cylindrical core 64 with the annular portion 94 engaged behind the upper end wall 70. The core 64 is then inflated, whereupon the cylindrical side wall portion 66 and the radial end wall 68 tightly engage with the corresponding portions of the scouring sleeve 86, and the scouring sleeve 86 is thus securely mounted on the core 64 and effects scouring action when said core is rotated by the motor 84.

When the radial end wall 68 of the core 64 is pressed against a surface to be cleaned, the pressure applied through the shaft 78 and the hub 74 tends to create a pressure point at the center of the end wall 68. Such a pressure point will cause undue wear on the scouring sleeve 86, and will reduce the scouring efficiency of the outer portions of the radial end wall 88 thereof. To alleviate this condition, the center of the radial end wall 68 is provided with a depression 98 in the region of the hub 74. This depression 98 prevents the creation of a pressure point upon pressing of the core 64 into engagement with a surface to be cleaned.

A modification of the mechanical scouring device of FIGS. 4–6 is shown in FIG. 7, and includes a core 100 incorporating a side wall 102, end walls 104 and 106, and a hub 108. The core 100 is identical in construction and to the core 64, except that the side wall 104 thereof is provided with an annular groove 110 near the radial end wall 104. The core 100 can be inflated and deflated through an air valve 112, and is mounted on a power-driven shaft 114.

A scouring sleeve 116 is mounted on the core 100, and is made from open mesh screen material like the scouring sleeves 62 and 86. The scouring sleeve 116 includes a radial end wall portion 118 from the outer periphery of which extends a short cylindrical side wall portion 120. The side wall portion 120 terminates at its upper edge in an inwardly directed annular portion 122, the inner periphery of which is secured to a circular element 124 made of wire or the like. The annular portion 122 and the circular element 124 are received within the annular groove 110, and when the core 100 is inflated serve to keep the scouring sleeve 116 properly positioned thereon. The radial end wall 104 of the core 100 is provided with a central depression 126, similar to the depression 98.

It is readily seen that, in all of the embodiments of the invention, a mechanical scouring device has been provided which incorporates an inflatable rotatable core upon which is replaceably mounted a scouring sleeve of open mesh screen material. The mechanical scourer of the invention provides effective cleansing action, and is constructed so that the scouring sleeve can be readily removed for cleaning or replacement.

Obviously, many modifications and variations of the present invention are possible in the light of the above teachings. It is therefore to be understood that, within the scope of the appended claims, the invention may be practiced otherwise than as specifically described.

I claim:

1. A scouring device, comprising: a frame, said frame including a handle portion, and a pair of spaced arms terminating in free end portions having aligned, confronting stub shafts thereon; an elongated, inflatable cylindrical core having hub means on the opposite ends thereof, said hub means being engageable with the free end portions of said spaced arms to mount said core on said frame for rotation about the longitudinal axis of said core, the said hub means on the opposite ends of said inflatable core each including a cylindrical bearing portion receivable on the stub shaft associated therewith, said core being readily demountable from said frame; a cylindrical scouring sleeve of open mesh screen material carried by said cylindrical core, said scouring sleeve being of a size to be received on said core when the latter is deflated, and to be in tight engagement therewith when said core is inflated; a motor carried by said frame, said motor including an output shaft; and means to effect a driving connection between said motor and said inflatable core, said means including: a first gear on the outer end of said output shaft; and a second gear carried by the hub means at one end of said cylindrical core, and arranged to drivingly engage said first gear when said core is inflated and is mounted on said stub shafts.

2. A scouring device as recited in claim 1, wherein at least one of said arms is resilient, so that said arms can be flexed apart to mount said core on and to dismount it from said frame.

3. A scouring device as recited in claim 1, including additionally a shield carried by said frame, said shield being spaced from and disposed above said cylindrical core.

4. A scouring device as recited in claim 1, wherein said inflatable core is molded so that when deflated the cylindrical wall thereof will bow inwardly between the axial ends thereof, and so that when said core is inflated the exterior thereof will be of substantially uniform diameter throughout the axial length of said core.

References Cited
UNITED STATES PATENTS

| | | | |
|---|---|---|---|
| 942,830 | 12/1909 | Hoy | 15—98 X |
| 1,663,132 | 3/1928 | Kingman | 15—209.5 |
| 1,901,825 | 3/1933 | Seibert et al. | 15—230 X |
| 2,215,692 | 9/1940 | Fleming | 15—230 X |
| 2,475,972 | 7/1949 | Longley | 15—230 X |
| 2,498,205 | 2/1950 | Goldenberg | 15—98 |
| 2,702,917 | 3/1955 | Lynden | 15—145 X |
| 2,722,029 | 11/1955 | Barnes et al. | 29—113 X |

WALTER A. SCHEEL, *Primary Examiner.*

LEON G. MACHLIN, *Assistant Examiner.*

U.S. Cl. X.R.

15—230.18